(12) United States Patent
Zhavi

(10) Patent No.: US 7,202,797 B2
(45) Date of Patent: Apr. 10, 2007

(54) SYSTEM AND A METHOD FOR DETECTING, LOCATING AND DISCERNING AN APPROACH TOWARDS A LINEAR INSTALLATION

(75) Inventor: Ron Zhavi, Yehud (IL)

(73) Assignee: Magal Security Systems Ltd., Yehud (IL)

( * ) Notice: Subject to any disclaimer, the term of this patent is extended or adjusted under 35 U.S.C. 154(b) by 0 days.

(21) Appl. No.: 11/107,647

(22) Filed: Apr. 14, 2005

(65) Prior Publication Data

US 2005/0251343 A1    Nov. 10, 2005

Related U.S. Application Data

(63) Continuation of application No. PCT/IL03/00836, filed on Oct. 15, 2003.

(30) Foreign Application Priority Data

Oct. 15, 2002    (IL) .................................... 152310

(51) Int. Cl.
*G08B 21/00*    (2006.01)

(52) U.S. Cl. ................ 340/686.1; 340/905; 340/853.1; 340/566

(58) Field of Classification Search ............. 340/686.1, 340/855.6, 856.4, 870.1, 905, 953, 564, 566, 340/854.5, 855.2, 853.1
See application file for complete search history.

(56) References Cited

U.S. PATENT DOCUMENTS

| | | | |
|---|---|---|---|
| 3,803,548 A | 4/1974 | Skujins, Jr. ................. 340/15 |
| 4,001,771 A | 1/1977 | Amrine et al. ............ 340/16 R |
| 4,172,576 A | 10/1979 | Svet, Jr. et al. ............. 246/128 |
| 4,328,487 A | 5/1982 | Cheal .......................... 340/554 |
| 4,374,378 A | 2/1983 | Lee ............................. 340/566 |
| 4,485,666 A * | 12/1984 | Higgins et al. .............. 73/23.2 |
| 4,953,144 A | 8/1990 | Chin et al. ................... 367/135 |
| 5,127,267 A * | 7/1992 | Huebler et al. ............... 73/584 |
| 6,003,376 A * | 12/1999 | Burns et al. .................. 73/584 |
| 6,216,985 B1* | 4/2001 | Stephens ..................... 246/120 |
| 6,580,976 B1* | 6/2003 | Belcea ......................... 701/20 |
| 6,834,836 B2* | 12/2004 | Heywood ................... 246/120 |
| 6,940,402 B1* | 9/2005 | Lewis et al. ................. 340/531 |
| 6,951,132 B2* | 10/2005 | Davenport et al. ........... 73/598 |

FOREIGN PATENT DOCUMENTS

EP    0 816 200 B1    2/2002

* cited by examiner

*Primary Examiner*—Daniel Wu
*Assistant Examiner*—Daniel Previl
(74) *Attorney, Agent, or Firm*—Winston & Strawn LLP

(57) ABSTRACT

A system and a method for detecting, locating and identifying incidents of approaching a linear installation (e.g.— buried pipe line, railway, fence etc.), that includes plurality of sensing units positions in an array along the length of the linear installation, at a distance one from each other, wherein each unit includes at least one sensor for sensing seismic or acoustic interference or noise/s (in accordance with the configuration of the system, namely either as buried system or an above the ground one), and the issuance of a suiting indicating signal; a signal processor for analyzing the signal and comparing it to a cache (data bank) of seismic or acoustic interference or noise signatures that is embedded in the sensor unit; and a communications device for transferring data from the sensor unit to a distant command and control center.

17 Claims, 5 Drawing Sheets

Figure 1:
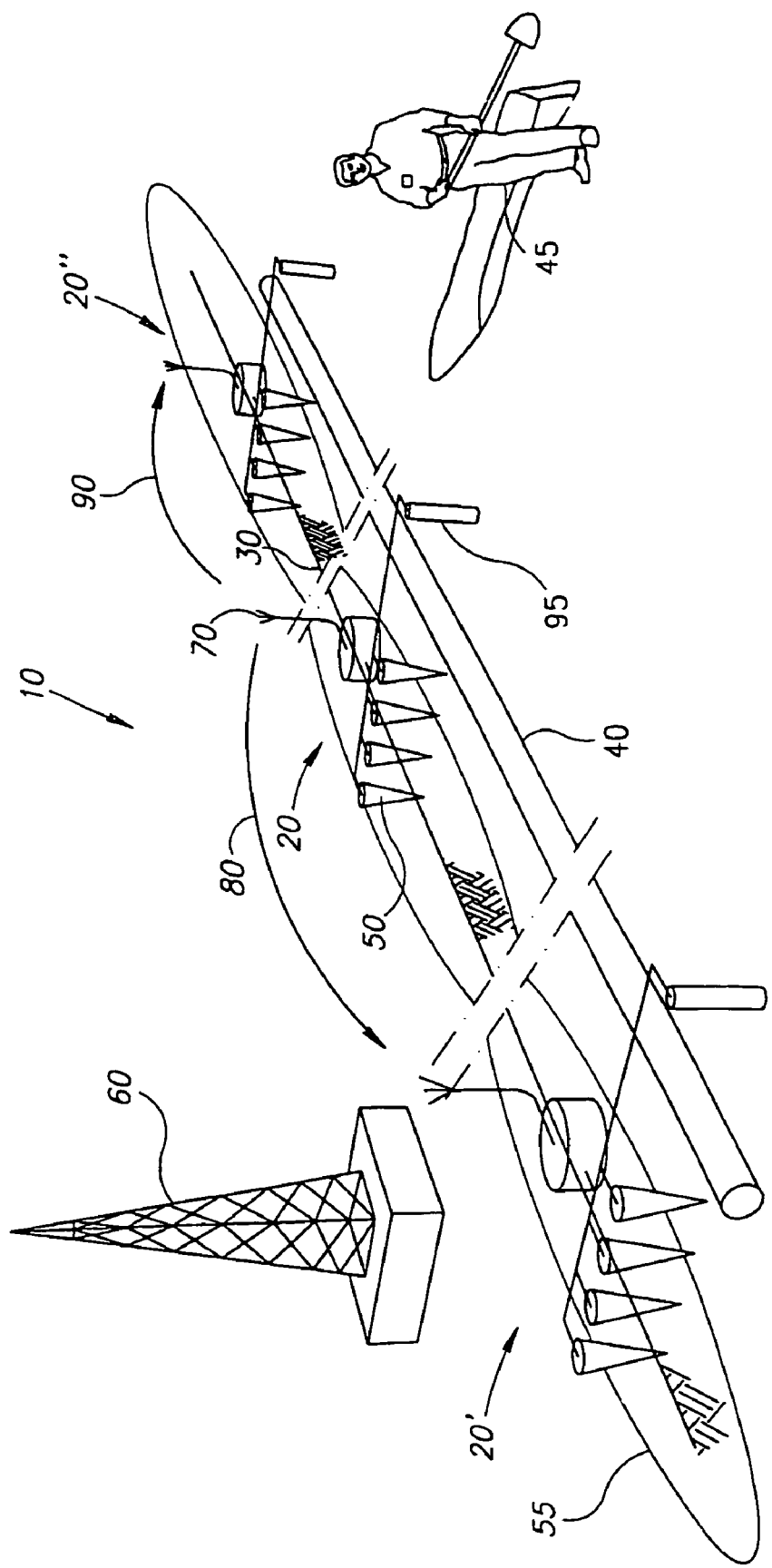

SYSTEM AND A METHOD FOR DETECTING, LOCATING AND DISCERNING AN APPROACH TOWARDS A LINEAR INSTALLATION

CROSS-REFERENCE TO RELATED APPLICATIONS

This application is a continuation of PCT/IL03/00836 filed Oct. 15, 2003, the entire content of which is expressly set forth herein by reference thereto.

BACKGROUND

The invention relates to the field of warning systems in general, and to the area of warning systems that protects linear installations, such as piping systems, railway tracks, electricity lines, fences and the like.

Many linear installations, be it buried ones (for example, piping systems) or above the ground ones (for example, railway tracks, fences along borders), constitute potential targets for sabotage or breaking in through them.

For example, in referring to an example that describes a preferred configuration of the present invention, a typical line for conveying fuel is a linear piping system that in most cases is buried in the ground, for example, 16 to 18 inch diameter pipes buried at 1.5 m to 2 m deep below the ground level and extending in a linear continuum of around 1,500 km in length.

Control of the fuel flow is carried out from several command and control centers, based on one or another data communications system, at times known as SCADA, that arrives from pumping stations located along its length, at a distance of 3 km to 20 km one from each other. Each of these stations is equipped with communication means and a power supply unit where required.

The data transferred by the system includes data relating to the status of the faucets along the route, information about the throughput level and the pressure (preferably if above a pre-set threshold level). Commands for opening/closing the faucets are sent from the command and control centers or stations to the pipelines.

It is to be emphasized once again, that the presented discussion considers only a single example, and that the invention is not limited just for being an application to piping systems buried in the ground, or only used for conveying fuel in the lines. An added example for different linear systems that are also buried in the ground might be a data transmission line or telephone cables.

An act of terror or vandalism damaging the line, or intrusion into the pipe line installations (e.g., one of the control stations), can cause huge and uncontrollable damage. In the fuel line example presented above, sabotage damaging the line might result in cut off of fuel sources at many locations, supply shortages, and even explosions accompanied by injuries or even death of humans as well as sever ecological damage to the environment.

Several activities that might result in damage to linear installation, such as for example a pipeline (fuel, gas), should be considered. They can be divided into several groups. Three essential ones result from human actions, and one can rightly be classified as "natural". Those that can result from criminal intentions are: drilling into or ruining the pipe in order to steal fuel; act of terror—demolishing the pipe; or a non criminal accident—such as a tractor conducting legal activities too close to pipe lines. "Natural causes" would include deterioration or wear (material fatigue); corrosion; environmental, e.g. "activity" of the ground such as earthquakes within a certain range, and the like At present, there exists no warning or alarm system suitable for protecting linear installations. Thus for example, in accordance with the example presented above, security measures for a fuel pipeline are essentially materialized by manned patrols—both on the ground and aerial ones, that are conducted along the pipeline. Sentries and guards strive to detect any suspicious activities or leaks from the pipelines. However, when patrolling very long lines, it is definitely impossible to cover the total length of the line at a satisfactory frequency, and this fact increases the motivation of terrorists or other intruders to conduct their malicious operations, as they know that the probability of being detected and apprehended is very low. They can, for example, hide at a distance until after the patrol passes, and then accomplish their felonious activities. Even the deployment of electro optical sensors, for example, video cameras, along the length of the line does not provide an adequate solution. Those detectors are expensive, exposed to the environment, burglary and vandalism, and require constant maintenance. Their performance deteriorates under certain detrimental environmental effects such as bad or lowered visibility level (night-time, mist or fog), and they cover very limited sectors and not the entire line.

The throughput data received from the pumping stations deployed along the line might help somewhat, but this "watching" system is calibrated solely to identify catastrophic occurrences, such as an explosion, rupture or cracking of the pipe. The system does not identify small scale local illegal pumping or stealing of fuel, nor does it provide exact information regarding the location of the problem area. In addition, as elicited from its specifications and definitions, it is clear that those existing means being discussed are essentially systems that report about incidents only after they did occur. They do not provide earlier warning messages indicating the would be intrusion or atrocious deed.

An additional type of system that is known in this field is concerned with self-propelled sensors that move along within the flow and detect discontinuities in the line. These sensors, however, are similar in results to those of the manned patrol that passes occasionally along the length of the pipelines, and its weakness, as a system is the outcome of its inherent low frequency operation.

A terror incident or intrusion into linear installations, when it is the result of actions by people naturally requires physical presence. Namely, it requires approaching the installation, i.e., walking or riding towards the installation, excavation in its direction and so on, and then calls for a "penetrating" act such as, for example, excavation, cracking the pipe envelope, severing the barbed wires strands, etc.

Hence, in recent years a solution was proposed, that is based on deploying an optical fiber alongside the length of the linear installation (e.g., the buried pipe line as per the parameters cited above in the example). The optical fiber is sensitive to shifting and vibrations and thus can serve as an indicator of movements along the pipe. When the ability to locate the site of a single event is studied, it is found that the optical fiber is capable of providing an exact indication of the position of the incident. However, a warning system based on optical fibers has many drawbacks, some of which are presented herein. In cases where several incidents occur simultaneously along the line, the system might reach saturation at a level that would prevent the processing of the received data. For example, a tractor working in an agricultural plot bordering on the optical fiber might appear as "an occurrence" of an extremely dominant incident that affects the optical fiber at a specific point and "blinds" the system rendering it incapable of detecting additional, simultaneous incidents in other (far away) locations along the line, that might be several orders of magnitude more dangerous than those that were detected.

An additional drawback stems from the susceptibility of the optical fiber to cuts or impacts. Cutting, severing or disconnecting the fiber—shuts off immediately a long sector of the system and "blinds" it. For example, within a sector of say 30 km long, damaging actions might take place unnoticed, "sponsored" by the break in the fiber's continuity.

A different, additional drawback stems from the fact that the optical fiber—due to its own long continuing construction—might be easily uncovered and exposed. Any clever terrorist or thief is apt to look for the fiber and damage it or disrupt its functioning at the location where it is expected to be found, namely stretched in parallel along the linear installation (as in the fuel pipe line serving as the above example).

An additional drawback of the cited optical fibers system—serving as means for providing warnings triggered by a person approaching the linear installation, such as for example a buried pipe in the ground from a long time past, is the difficulty to upgrade the linear line in order to deploy the fiber along its length. In other words, when a pipe that was buried in the ground a long time ago is considered to be upgraded with such fiber optics based warning system, then excavating it open entails the opening of a wide ditch and exposing the pipe all along its length.

Yet another additional drawback associated with a system that is based on indications resulting from exposing the optical fiber to local movements and/or bending is the inability to identify the exact type of the interference. The same indication might be received due to a herd of innocent cows traversing the line as well as from an intruder excavating towards the line in order to steal fuel.

Finally, at times it is just impossible to obtain the required continuity when deploying the fibers' line, as for example when the pipe line traverses a river or passes over a bridge—where it is exposed to the naked eye, or crossing through a difficult to access wadi or over a boulder/cliff.

It should be pointed out that a physical access to a linear installation and performing a penetrating or piercing activity into it, produce by their inherent nature—acoustic or seismic signals, or in other words—they produce acoustic or seismic "noise". Put differently, acoustic or seismic noise might constitute an indication to the occurrence of an act of physical approach and/or piercing or penetrating felonious activity on the line.

Sensors that enable the detection of seismic or acoustic interference or noise are known and recognized in the field. It is not sufficient just to detect an interference or noise for providing an effective warning regarding the occurrence of a physical access effort or penetrating action onto or through the linear installation. It is also necessary to determine exactly the accurate point—along the length of the line, at which the malicious activity is in process (while the line might extend, as mentioned, for many kilometers).

Sensing technologies and position locating techniques of targets—that are based on an acoustic sensor (detector) are known and recognized in the field, see for example International Patent application No. WO 01/92846.

Relying on sensing of seismic/acoustic interference and/or noise as an indication to the occurrence of physical access effort and/or penetration action and to the location of this incident, is not an effective one as long as no capability of identification and verification were integrated into the system at a high reliability level that they do not constitute false alarms.

Obviously, routine and innocent activities occurring along the installation line and through the linear system, if they happen to be such that might generate noises or interference, while there is no capability available to identify and verify them and their true nature, might generate false alarm at an undesirable frequency.

To recapitulate, as per the inventor's best knowledge and awareness, at a time preceding the invention and subject matter of this patent application, there was nowhere in existence, a system at a reasonable low price, whose implementation along the linear line would enable detecting, with a high level of confidence, the existence of suspicious or threatening physical approach to the installation and/or penetration/breaking in through its envelope.

On the other hand, it would be desirable to have a system that would provide, simultaneously and accurately, information displaying the exact location of the felonious activity at a high reliability and high confidence levels, regarding the incident in progress. It would be helpful for the system to also supply information on the nature of the occurrence. Moreover, the components of the system should be easy to hide, with the system maintaining its optional performance under all weather conditions and imparting technical and operational advantages (e.g., operability that continues even if one of its components is exposed and destroyed). A further desirable feature would be that the system enable convenient integration into the already existing system of the installation located in the area (for example, as a system to be added on the old pipeline that has been buried in the ground long ago). A system possessing these desirable features is now provided by the present invention.

SUMMARY OF THE INVENTION

Considering one aspect of the present invention, the subject matter of this application, it is offered as a system that can be viewed as providing desirable features for detecting, locating and identifying incidents or occurrences of approaching towards a linear installation that includes several discrete sensing units located in an array along the length of the linear installation at a selected distance one from each other.

Each unit includes at least one sensor for detecting seismic/acoustic interference and/or noises in accordance with the configuration of the linear installation—namely whether as a buried system or an above the ground one; signal processing means embedded in the sensor for analyzing the received signal and comparing it to a cache (i.e., a data base) of seismic/acoustic interference and/or noise "signatures"; and communications means for transferring information from these sensor units to a distant remote control unit.

In preferred configurations of the system—the subject matter of this application, the sensor unit includes several sensors, arranged in a linear array for focusing the cover lobe on the area of interest based on a phased array calculation between them. The communication means include also reception means, and transfers the information by a chaining mode towards the communication and reception means of the two sensor units adjacent to it, preferably with one of them located on one of its flanks and the other one on the opposite side.

In additional and different preferred configurations of the system—the subject matter of this application, the system includes also several visual target verification units located along the linear installation's length, at a certain distance away one from the other. For example, they can be surveillance devices incorporating cameras with or without night vision means, which are enslaved to the sensor units array and are triggered (namely—receive their excitation) by it.

In a different and additional aspect of the invention—the subject matter of this application, a general method of detection, localizing and identification of an occurrence is presented. In this aspect—the occurrence is an act of a suspicious approach towards a linear installation. The method—includes the stages of mounting discrete sensor units in an array alongside the length of the linear installation, at a certain distance away of each one from its neighbor; implementing sensing of seismic or acoustic interference or noise signals in accordance with the configuration of the system—as a system that is either a buried system or an above the ground one—that is happening along the periphery of the linear installation; comparing the received signal to the data base of seismic/acoustic interference and/or noises "signatures" that is embedded in the sensor unit; and transferring data from the sensor unit to remote command and control center.

In a certain preferred configurations of the method that is the subject matter of this application, an early stage is implemented in the system. This stage consists of focusing the cover lobe on the area of interest based on a phased array calculation, and a stage of chaining data along the sensor units.

In a different and additional configuration of the method that is the subject matter of this application, the method implements an additional stage—a stage of excitation of at least one visual target verification unit, in accordance with the position or location of the sensing along the length of the linear installation.

BRIEF DESCRIPTION OF THE DRAWING FIGURES

The present invention that was described above briefly, would be better understood and appreciated by studying the description of the preferred configuration of the invention, as it is described below by addressing the reader to the accompanying drawings.

FIG. 1 constitutes a general illustration of the preferred configuration of a system in accordance with the invention, wherein it is implemented for issuing a warning against a felonious approach to the installation as shown in the illustrated example—namely to a buried fuel pipe line.

Figure 2:
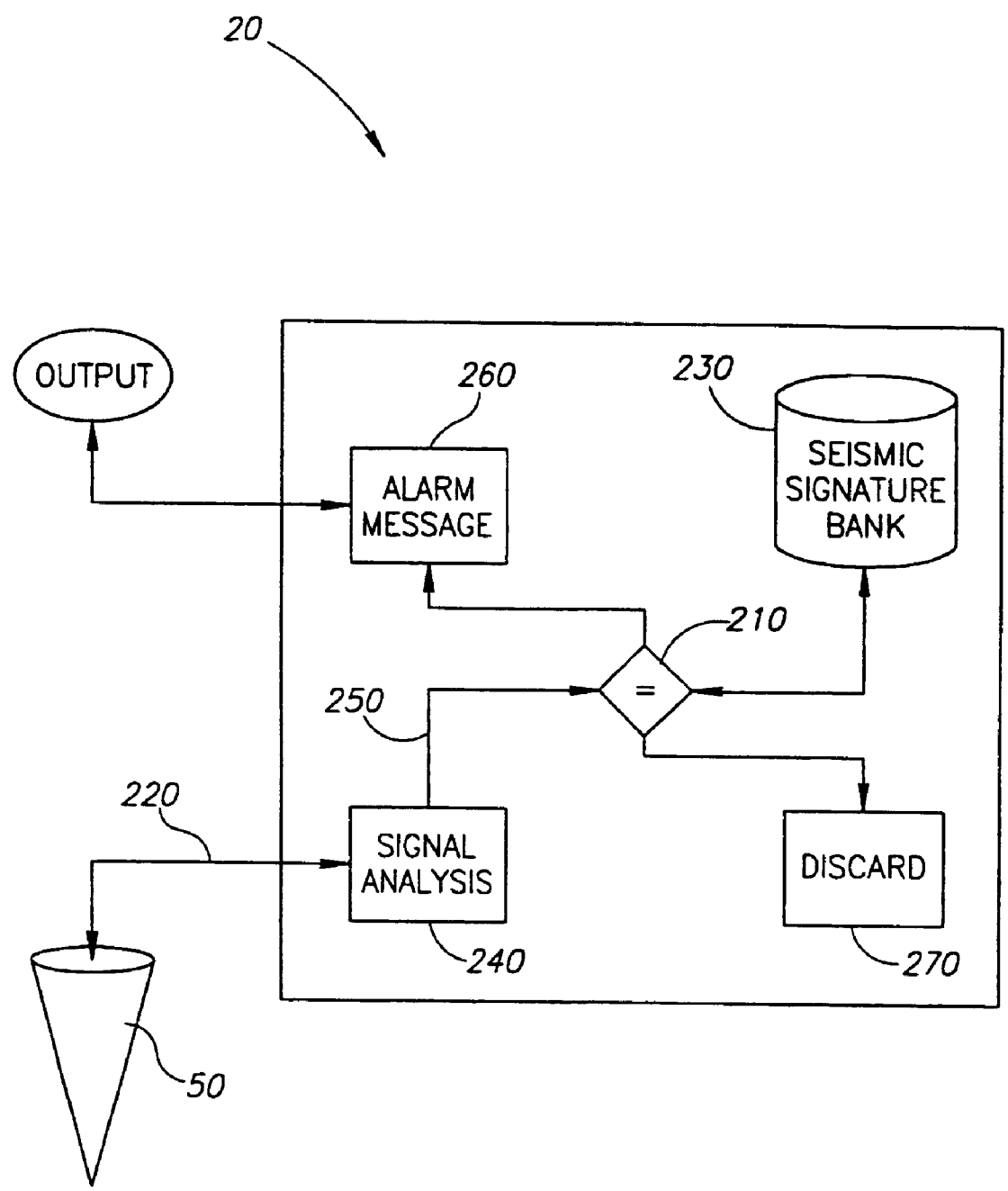

FIG. 2 constitutes a schematic scheme presented in block diagram level, of the algorithm implemented in the system in accordance with the invention to provide a decision whether the received signal justifies issuing a warning or not.

Figure 3:
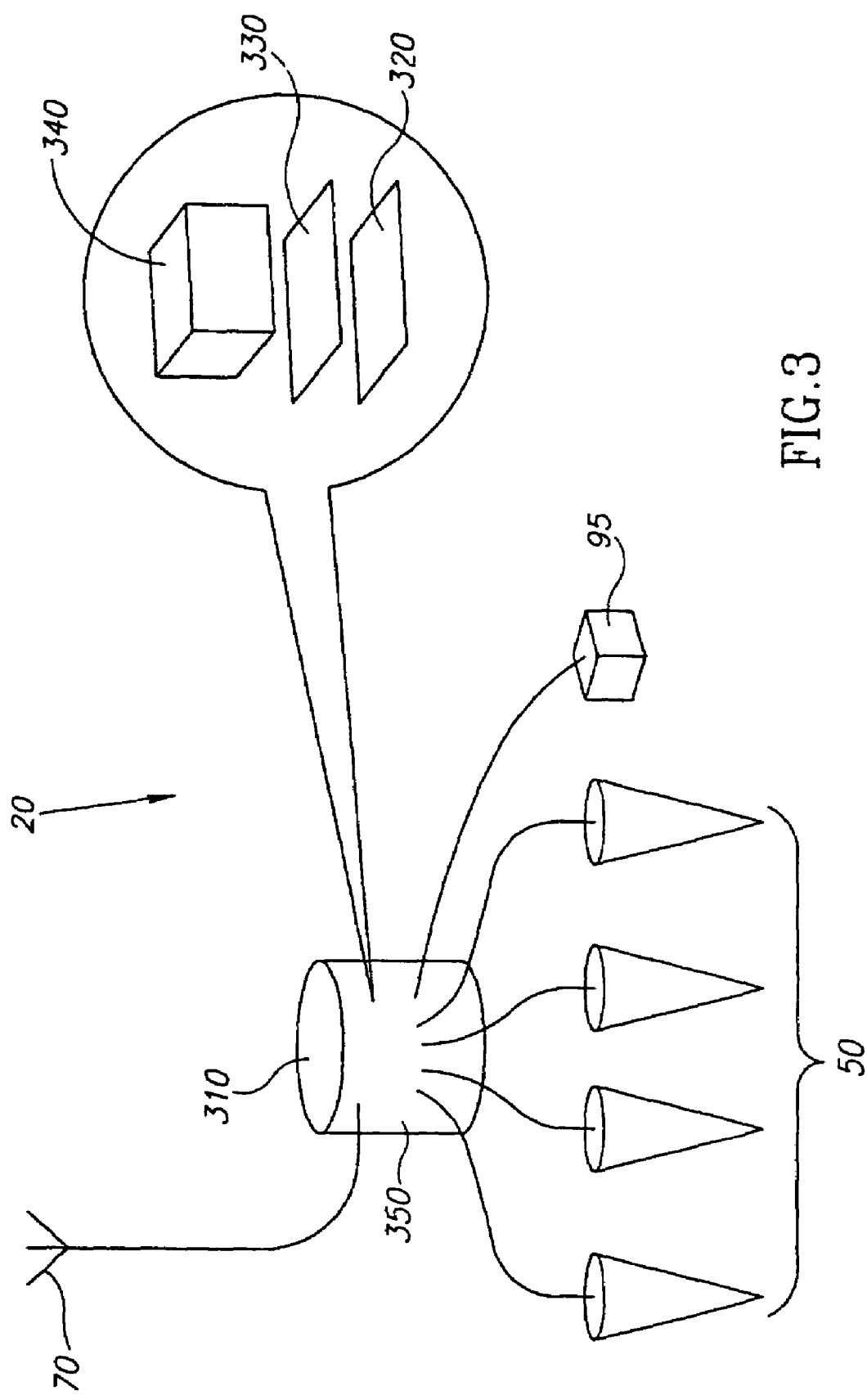

FIG. 3 constitutes an illustration of one sensing unit in accordance with a preferred configuration of the invention.

Figure 4:
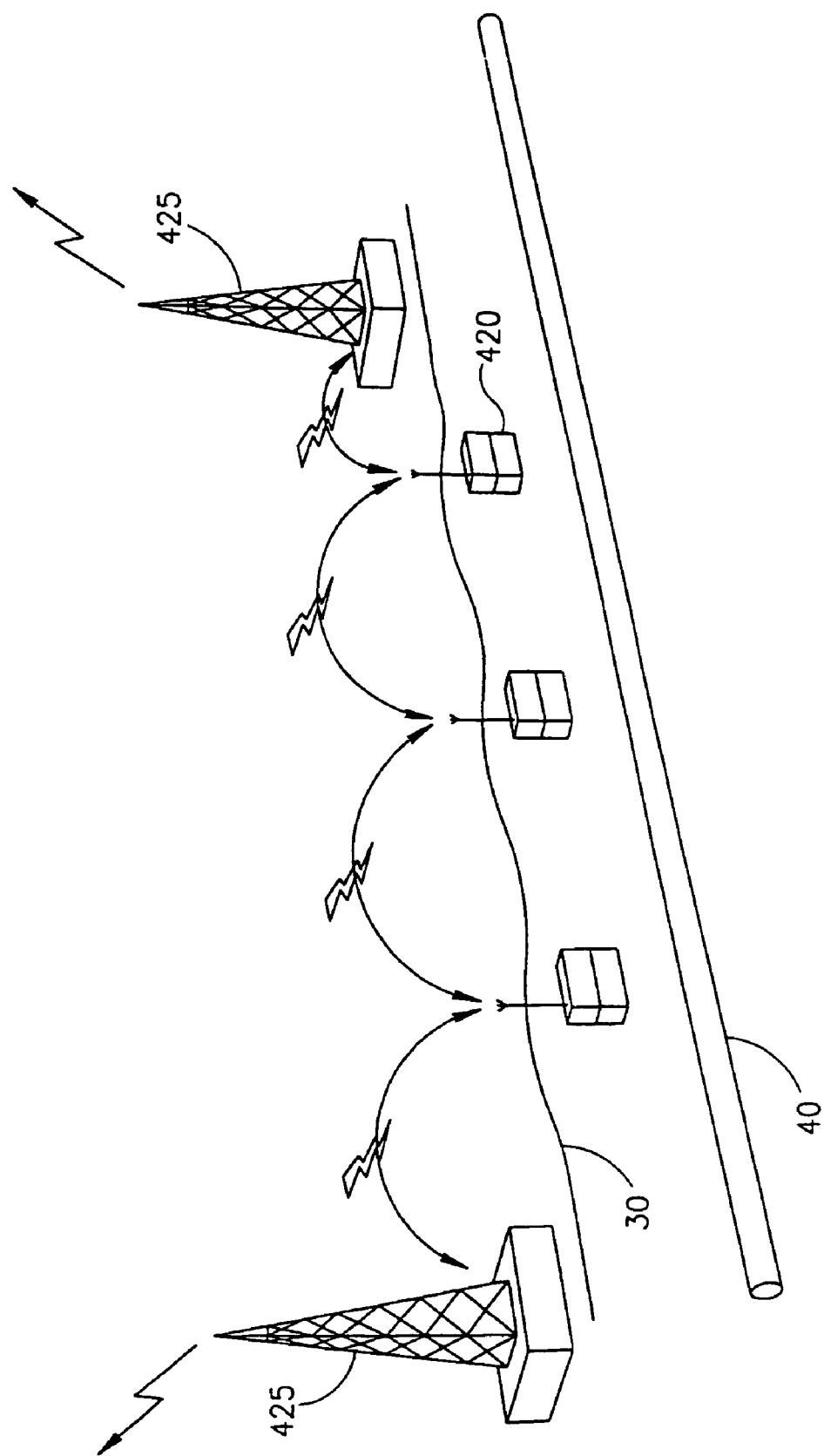

FIG. 4 constitutes an illustration that describes the chaining principle of the data arriving from the sensing unit along the line—as it is implemented in the system in accordance with a preferred configuration of the invention.

Figure 5:
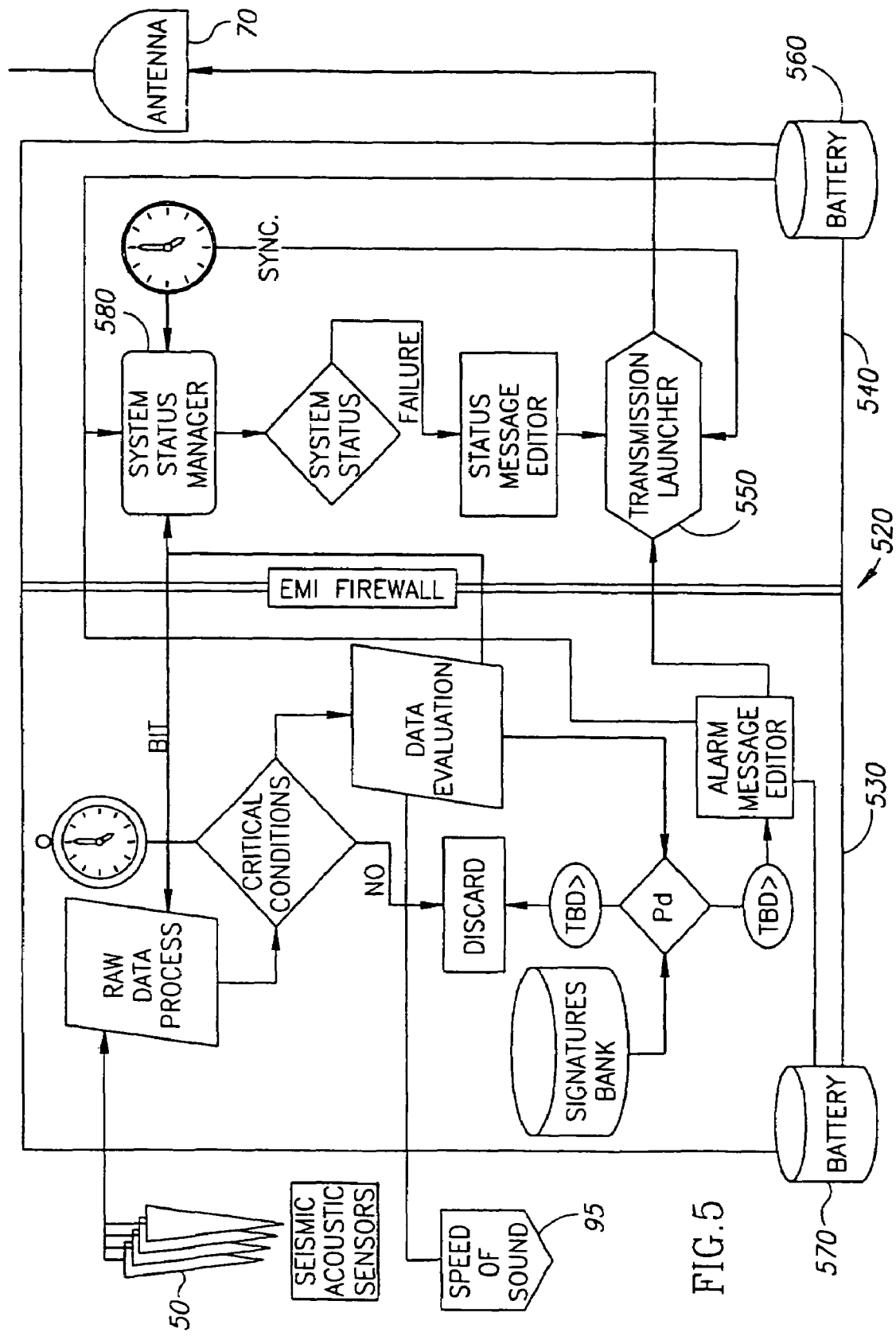

FIG. 5 constitutes an illustration that describes—at the block diagram level, the operational algorithm of a sensing unit in accordance with a preferred configuration of the invention.

Note that same numbering is given to similar elements depict in more than one figure.

DETAILED DESCRIPTION OF A PREFERRED EMBODIMENT OF THE INVENTION

Referring to FIG. 1, the system 10, whose preferred configuration is described hereinafter, should be viewed and appreciated solely as an example, depicting a sensing unit 20 deployed under the ground level 30 along a fuel pipes' line 40, in order to detect excavation efforts (illustrated as digging effort by intruder 45) or activities towards the pipe.

The system operates by implementing the principle of seismic sensing, and processing of the signals received from the sensors (vibrations detecting geophones 50). The product of the processing is a "typical (characteristic) signature" of the disturbance. This signature is compared, in real time, to a data bank of signatures stored in the system's memory, and if a match is found—through identical correlation level (namely, match) being above a certain given threshold—the system issues a warning sending it to a remote control center 60.

In order to insure the establishing a good "fix" (namely obtaining an exact reading of the location) of the site of the intrusion or the approaching menace 45, discrete sensing units 20 are deployed along the line at equal distances, for example 200 to 300 meters from one to another (the value of the exact distance should be established in accordance for example, with environmental conditions, such as type of soil, levels of noise in the neighborhood and so on.

System 10 has two basic installation configurations: wired and wireless.

The wire version (not shown) is intended for areas in which agricultural work is conducted above the pipes system, or alternatively also for areas in which layers of snow or ice cover the ground, cases in which it will be impossible to use antennas located above the ground or just under it. The wireless version (illustrated in FIG. 1), suits areas with trouble access or where excavation would be difficult (rocks), and is based on connecting a thin (and easy to conceal) antenna 70 that protrudes just slightly (for example—15 cm) above the ground level. Such an antenna 70 is connected to each sensing unit 20.

Data transfer in system 10 is based on the chaining principle. This means that each sensing unit 20 "notifies" its two adjacent units (one at each of its sides—see arrows 80,90 in FIG. 1) about the occurrence/existence of hostile activity (in accordance with the results of an analysis, to be described below).

These two units (marked 20' and 20") transfer the message onwards. It is to be noted that thus the data transfer is be-directional. It proceeds until arriving at the nearest communication station (not shown). Such stations, as are located along all the fuel lines, located in the pumping stations which are positioned along the pipe line at various distances of approximately up to 30 km one from the other.

Establishing the location of the incident site, is derived form cross-cutting (merging) the intensity and the sense of the signal, based on a number of sensors 50 (in the illustrated example, four sensors), that are arranged in a line perpendicular to the direction of the linear installation. In the presented example that would be perpendicular to the pipe line 40 direction. Comparing between the phase of the wave in each of sensors 50 and taking into account the known propagation velocity of the seismic wave signal at the area in the vicinity of the sensing unit 20, enables to calculate the signal's propagation velocity and then its direction. The wave propagation velocity is obtained from a device measuring the velocity of the sound 95.

The power supply source for the units 20 of system 10 depends on the system configuration. In case of a wired configuration (not shown), the communication cable serves also for the power supply line from the nearest station. In the case wherein the wireless configuration is used, cells are used, for example lithium batteries with an approximately ten-year life expectancy (not shown).

Any professional experienced in this field would understand that it is possible to program the operational "logic" of system, as well as its hardware components, so that the long range system power consumption, as well as within peak operation periods would be minimal. In order to achieve it—it is feasible to specify for the system a regime that exploits the fact that a excavation operation along the line requires at least several if not many minutes and thus drive the system to a dormant spell for minutes at a time, and to activate ("wake") it into operation for a short duration at relatively low repetition rates.

In accordance with a preferred embodiment of the invention, the system's sensors 50 are geophones sensors, sensitive at the 10 to 30 Hz range, a range well suited to the wavelengths required for the identification process by the system, namely 10 to 30 meter. The principle of operation of these sensors is recognized and known for a very long time, and is based on a weight located within a magnet. Movement or shifting of the weight due to vibrations of the sensor's body results in changes of the electro magnetic fields expressed by voltages in the microvolts range, that in turn are amplified to a larger raw signal to be processed and analyzed by the system. Suiting sensors are manufactured by the Geo Space LP Company, and denoted by it as GS-30 CT and GS 32 CT. The geophones sensor is buried vertically, as exactly as can be practically achieved, because the geophones sensor is sensitive to seismic waves only in one plane, while forming a direct contact between the metallic part of the geophones sensor and the ground.

The depth the sensor would be buried or concealed—would be fixed in accordance with the type of soil and the intensity level of the background noise/s in the area of systems' installation. From experiments carried out it was ascertained that the optimal burying depth should be more or less half the depth between the pipe and the ground surface level.

The analysis of the signal received from the geophones sensor 50 is done based on a mathematical algorithm that essentially factorizes the received signal to its components within the range of the frequency. Any professional experienced in this field would understand that it concerns a routine development of an algorithm that is the one required to identify very short signals that characterize the excavating operation.

The components of the signal are defined as a "seismic signature" of a specific interference disturbance and include parameters such as the duration of the disturbance, its intensity and behavior characteristics along the time axis. In order to obtain the seismic signature, the first stage has the raw signal undergo a spectral analysis that factorizes it to its various frequencies components. The second stage consists of separating the specific signal of the incident from the multitude of signals of the noise/s undergoing a filtering step.

This separation to a "clean" signal is a crucial step and it is essential for enabling the application of the algorithm at a later stage.

Any professional expert in this field would understand that the system's capability to perform "identification roles" in accordance with the invention is the system's most significant and powerful feature. This capability is based on a comparison of the seismic signature of the cleaned signal to the contents of a data bank of signatures of relevant signals. This cache of signatures was built in cooperation with a customer for a specific system and will be tailored to his requirements. This data bank has two major elements, the first element being a collection of signals defined as "threatening", which runs the gamut of activities that the customer defined as relevant to his applications and for him they constitute the basis for "real warnings". The second element is a cache of signals of known and practically recognized background noises that characterize the specific area in which the system is installed. Some of them would be defined when the system will be implemented (for example, noise of a train that passes in the proximity of the buried pipelines), and others would be added or updated for years to come.

If we refer to FIG. 2, the drawing describes the algorithm serving for running the analysis and examining the criterion for arriving at a decision whether the received signal justifies issuance of a warning or not. The figure describes the comparison step 210 of the signal 220 to the signatures data bank 230. A raw signal is received from a sensor. Signal 220 undergoes filtration and spectral analysis 240 delivering a "clean" signal 250. Signal 250 is compared now with the data bank's seismic signatures 230. If the signal is similar to signals that were defined as "threats", or if it is different from the signals that were defined as "background noise", then the command 260 to issue a warning (an alarm message) is given. If the signal was found to—be similar to one of those defined as background noise, the "Discard" function 270 is operated on it.

Measuring the sense of the disturbance along the line provides a very important parameter of a system in accordance with the invention. This, as part of the motivation which is obvious to any expert in this discipline, to focus the analyzing efforts (an efforts that requires computing resources and electrical power) to treat only cases of high relevance, namely—to incidents that, in accordance with the example to which the invention refers, are considered to be of a potential to damage the fuel pipe line. For example, an excavation action being conducted on either side of the pipeline at a distance of approximately ten meters—is not relevant, even if it is defined absolutely as an excavation act. On the other hand, an excavation operation conducted at very close proximity to the pipe is definitely "relevant" and dictates the issue of a warning.

The capability to measure the sense of the disturbance along the line in accordance with the invention, is achieved by coupling several sensors along the line, and positioning them in an array perpendicular to the line, as depicted in FIG. 1 (in which arrays of four sensors 50 each are illustrated). Because the signals from all the sensors arrive simultaneously at the signal processing means (see FIG. 2 element 240), it is possible to exploit it in order to compare between the characteristics of each one of them (phase comparison) and extract from it data regarding the vector direction of the source of the signal (beneficial phased array configuration). In other words—the plurality of sensors 50 are arranged in a linear array pattern for focusing the covering lobe onto an area of desired surveillance (see shape of coverage zone 55 illustrated in FIG. 1). The phased array effect is aimed to focus the coverage lobe of sensors 50 along the axis of pipe 40, thus increasing the sensitivity and therefore the effective range along the pipe where the potential threat is relevant, and at the same time, decreasing it to the off-axis areas where the signals are most likely false alarms.

Any professional in this field would understand, that in order to obtain such phased array capability, it is required to know the propagation speed of the signal. A device for measuring the speed of sound (noise) is implemented as part of the system (see device 95 in FIG. 1). In contradistinction to propagation properties of electromagnetic wave, the propagation speed of seismic waves in the ground varies in accordance with the different types of soil at different sectors along the same pipe lines, or alternatively, at the same exact location but in different seasons of the year, depending on the prevailing humidity conditions.

Device 95 for measuring the speed of sound (noise) is mounted at a known position relative to the multi sensors array cited above (see component number 50 in FIG. 1). An example of such device 95 is a device comprising small electrical motor, which drives a screw lifting a disc within a resonance box. Upon reaching the end of the screw length, the disc fall within the box, producing a strong seismic signal.

The principle of operation of a "sound speed meter" 95 is the generation of a strong seismic signal at a given known time and relative location, and establishing the time of receiving the signal at each of the sensors 50, thus obtaining the elapsed time for each of the sensors in the array near to it (four sensors 50 in the illustrated example of FIG. 1). The comparison between the reception time and as the relative distances between them (the distances to the burying spot) is known, and enables the exact measurement of the local propagation speed of that specific seismic wave.

Any professional expert in this field would understand that because the property of the wave propagation speed is a property depending on the soil, and—as said—it is expected to vary during the hours of the day and the days of the year, then in systems embodied in accordance with the invention, such speed measurements would be performed at a given frequency (for example, several times in a twenty four hours day).

The basic unit of the system in accordance with the invention is the sensing unit 20. Referring to FIG. 3, the unit's package 310 contains in it all the elements required for receiving the signal, analyzing it and arriving at a conclusion whether this is a signal that justifies the issuance of a warning, or not.

In addition, other components such as the required energy sources for its operation and the communications unit are also packaged into it.

In reference to FIG. 3, the sensing unit 20 illustrated in the drawing exemplifies a wireless sensing unit. The device encompasses four geophones sensors 50 capable of sensing seismic/acoustic interference/noises, a signal-processing means capable of processing the received signal and comparing it with the seismic/acoustic interference/noises signature cache built within the sensing unit-signal-processing card 320, and a communications means capable of transferring data from the sensor unit to a remote command and control center—a communication card 330 linked with antenna 70. In addition, the sensing device includes a pack of batteries 340 providing the power to the unit and a sound-speed meter 95.

The unit's components are contained within a package 310 that can withstand severe environmental conditions (for example—a galvanized steel package), thus enabling satisfactory life expectancy at underground conditions (for example—for a minimal period of ten years). The packaging method of the package must enabling maintaining the impermeability required for underground conditions of humidity and dampness, while still enabling opening the package to replace the batteries.

Any professional in this field would understand that the package might be a single package used both for wired and for wireless configuration of the sensing unit. Thus, for example, the package 310 illustrated in FIG. 3 has six outlets 350—four for the geophones sensor 50, one for the sound-speed meter 95, and one for the antenna 70, or for the communication cable in the wired configuration (not shown).

As aforesaid, the analysis of the signal is achieved at the sensing unit itself, where it is also determined whether the incident is of sufficient certainty or not. In case the incident is of sufficient certainty, the relevant data is transferred to the control center via wireless communication or via wired communication.

In the aforementioned example, the communication is a wireless bi-directional one—from the sensing units to the control center and from the control center to the sensing units by transmitting/receiving communication means.

The communication from the sensing units to the control center may includes data concerning the sensor's ID, the type of incident (for example—excavation), the analysis certainty rate (for example—98%), the direction of the incident from the unit (this datum will be used for representation at the control center), the signal's magnitude, check signal to inspect the functionality of the sensors and the state of the battery.

The communication from the control center to the sensing units may includes data concerning parameters' update (for example—elevating the rate of sensitivity), the software's update (for example—updating new signatures for the data bank), and sensing units' operation termination/reactivation orders (for example—in case of initiated work implemented by the fuel company in the vicinity of the sensing units).

In the aforementioned example, the data-transfer principle relies on chaining the sensing units along the line. Each unit transmits short-range data (for example—300–500 meters). Short-range communication components that fit the discussed transmitting/receiving communication means, are for example, products that operate within the UHF range and manufactured, for example, by Telematics Wireless.

The chaining principle is illustrated in FIG. 4. The transmitted data is received by the neighboring sensing units 420, which transmit it further along the line and onward to the nearest transmission stations 425 on both sides, and from there onward to the control center (not shown).

Every professional can understand that the communications' chaining enables saving transmission energy and offers redundancy (the data is chained to two transmission stations).

Wired communication configuration is needed for places where it is impossible to use external antennas, such as heavily snowed areas, or areas where agricultural activity takes place above the pipe. In the first incident it is impossible to use antennas due to the contact between the antenna and the snow, while in the other incident it is impossible to use them due for a possible hazard such as where the antennas are brought down by plows.

With the wired communication configuration it is possible to combine batteries as a power source for the sensing units, with a designated communication cable, which connects between the sensing units and the end stations. Since the sole purpose of the cable is communication, the path in which it is laid is virtually of no significance and it is possible to burry it a far from the pipeline and at various depths (for example—some 5 meters from the pipeline and at a depth of some 50 cm), thus making its detection more difficult.

Every professional can understand that the wired configuration also enables feeding electrical power to the sensing units from external sources instead, or as backup and for charging an integral array of batteries. (With a double-function line—a line both for communication and for power supply).

Referring to FIG. 5, the drawing constitutes an illustration that describes—at the block diagram level, the operational algorithm of one example of a wire-less sensing unit 520 in accordance with a preferred configuration of the invention.

The figure itself is self-explanatory to any professional skilled in the art.

The left side of the scheme 530—represent the signal analyzing section, while the right section 540 represent the regularity checking circuit of the unit.

Energy saving consideration dictates two-step analyzing of the raw signals received from geophones 50. In the first step, a threshold check is conducted. The signal intensity is being checked in order to evaluate if the signal worthwhile a full analysis. In the next step, the full analysis is taken place while considering the data arrived from the velocity meter 95 (for pinpointing location) and the signal comparison to the data bank of "signatures" 230.

If the level of correlation between the signal and the signatures is high and in any case—if the signal is not similar to any known false alarm type of signatures, the unit may implement additional screening parameters. Such additional parameters will provide additional tests to the validity of the signal before allocate it as an alarm-causing signal.

Any professional in the art will understand that such parameters their type and number may be updated and upgraded over time and system version.

If the signals pass all the criteria, a warning message will be transmitted via the transmission means 550 depict at the right side 540 of the scheme. Note that the battery pack provided in the illustrated example is separated to two sub-packs 560,570, but any professional will understand that such battery packs can be integrated to one common single pack.

The right side section 540 also depicts the regularity checking means 580 of the unit. In accordance to a pr-defined timing, the remote command and control center (not shown) will initiate the transmitting of a specific initiation signal. The corresponding unit will receive the signal through its transmission and receiver means 550, and responds with a verifying signal signaling its regularity statues.

Lack of response will indicate the unit failure.

As aforementioned, a system based on the preferred configuration of the invention may enables updating and calibrating several parameters that affect its function (during installation and later—via communication from the control center). Such updateable parameters could be for example—the certainty rate parameter or in other words—the confidence level. This parameter sets the system with the required certainty rate, conditioning the setting of the signal as a threat. This parameter represents several tests, for example—the signal's magnitude, the signal's direction, similarity to a predefined signal in the signatures cache (data bank) and the activity's duration.

Area coverage parameter—this value will define to the system the coverage range between the pipe's sides. The smaller it is, the narrower will be the area of activity reported by the system.

The signatures bank parameter—the bi-directional communication capability enables the operator to load a new software program to the sensing units through the communication network, an updated software program, which includes new threats and their acoustic signature. In addition, the operator may cancel warnings concerning certain threats. This application is vital, for example, when routine maintenance tasks, which might invoke false alarms, are planned to take place along the line.

A parameter for "neutralizing" (i.e., shutting down temporarily) one specific sensing unit or more—the operator could use communication to "neutralize" one, or several, units for a predefined period of time. This capability might serve as vital in attempting to save in power supply, for example—if it happens while in some areas there is no need for a warning, for example due to the presence of a manned patrol at the site.

A status check parameter—the operator can request an initiated status report from one specific sensing unit, or more, which could include, for example, data concerning the state of the battery or the state of the memory.

A recovery parameter—the operator could request one specific sensing unit, or more, to recover a recording of raw signals several up to several hours back in time, and their analysis method.

A software update parameter—the communication layout was indeed designed based on narrow bandwidth data transfer conditions, yet, the system will include an inherent capability to transfer software blocks from the control center to the designated units.

A sound-speed parameter—the control center could initiate a sound-speed inspection at a specific sector (in the proximity of one specific sensing unit or several neighboring units), for example—to inspect a threat for leakage. A system upon the principles of the invention measures the sound-speed within certain specific areas. A rapid increase in dampness at the sensing area accordingly changes the sound-speed and might indicate a leakage at that specific area.

A background-noises update parameter—the control center could inform the relevant units regarding the expected presence of an activity of certain seismic characteristics, in an attempt to prevent false alarms. This application is relevant both for preplanned maintenance operations along the line, and for every other "innocent" activity.

Every professional expert in this field can understand that this ability of remote parameters' update could be implemented in respect of one specific sensing unit, a certain area that includes several adjacent sensing units, or several discrete units along the line.

As aforementioned, the invention is described in reference to an application aimed to detect excavation nearby a line installation such as a buried pipe (fuel, gas or water pipes), through detection and sensing of activity above the ground of a unique signature which indicates malicious intentions to damage the pipe. But any professional in this field would understand that the various applications that might suit the system and the method may also include detection, location and identification of any attempt to approach any other type of pipe installation, or any undefined "pipe installation"—a borderline or a "separation line". In other words—The present invention might be implemented, for example, for sensing and identification of excavating a tunnel in a relative small depth (for example—3 meter), and thus be exploited for protecting a linear installation of a type such as the walls of a prison or along the perimeter of an enclosure, protecting it against intrusion into it or fleeing out from it through a tunnel. Another feasible implementation of this invention might be sensing noises of walking/marching in security applications. Such an application is known as pre-alarm, and it is intended to focus the existing protection measures in an array protecting a perimeter, i.e., cameras, manned patrol vehicles, etc., onto a suspected entity found in the vicinity of the enclosure. Another potential application of the invention might also be in security tasks—to identify movements of vehicles. This application is similar to the one just presented above, but it emphasizes the detection of movements of vehicles and discerning between vehicle types (i.e., whether it is a light vehicle, a truck or perhaps vehicles on tracks (e.g., armored troop carriers), etc..

An additional application could be protecting linear installations such as railway tracks from damage, based on sensing excavation activities aimed at the railway tracks, or around them or between them, as a preparation for laying explosive charges or any other object that might harm the train.

In addition, a system in accordance with the present invention might be used for directing visual target verification means—electro optical means that would be enslaved to it. Such means might be for example video cameras, having a long viewing ranged coupled with a relative narrow field of view, towards a location of suspicious activities that were detected by the system, and thus obtain effective visual coverage in day time and even under night time conditions (aided by appropriate illumination equipment in the visual or the infra red range and/or coupled with amplification of received light signals).

An additional implementation that could be materialized by a system in accordance with the present invention, is the detection and establishing the location of local leaks that are caused as a result of internal corrosion processes, wear or local fracture of the pipe for any reason whatsoever. A system in accordance with the invention measures the speed of sound of a bulk (material) in a focused area. A quick rise of the wetness (moisture) level at the area being sensed alters in tandem the speed of sound and might indicate the existence of a leak in that area.

Any professional in this field would understand that the sensing unit and the applications that were described above are presented merely as examples.

The sensing unit might include other components—different or additional ones (for example, an interface for supplying power via a cable/special line, an interface for solar power supply, etc.), it will be appreciated by persons who are skilled in the art, that the present invention is not limited by what has been particularly shown and described above. Rather, the scope of the present invention is only defined by the claims that follow.

What is claimed is:

1. A system for detecting, locating and identifying incidents of approaching a linear installation, that includes a plurality of sensing units positioned in an array along a linear installation at a distance one from each other, wherein each unit comprises;
   at least one sensor for sensing seismic or acoustic interference or noise in accordance with configuration of the system, and means for generating a suitable indicating signal;
   signal processing means for analyzing the signal and comparing the signal to a cache or data bank of seismic or acoustic interference or noise signatures embedded in at least one of the sensing units; and
   communication means for transferring data from said at least one of the sensing units to a distant command and control center;
   wherein each sensing unit comprises a plurality of sensors arranged in a linear array pattern for focusing the covering lobe onto an area of desired surveillance in order to provide a calculation of distance using phased array technology.

2. The system of claim 1 wherein the linear installation is a buried or above ground system.

3. The system according to claim 1, wherein each sensing unit comprises a plurality of sensors arranged in a linear array for measuring the speed of sound in a potential relevant area of interest and adapted to generate a vector pointing at the source of noise.

4. The system according to claim 1, wherein each sensing unit comprises four sensors.

5. The system according to claim 1, wherein each sensing unit further includes a device for measuring the speed of sound or noise.

6. The system according to claim 1 which further comprises at least one visual target verification means, located alongside the length of the linear installation and enslaved to the sensing units.

7. The system according to claim 1, wherein the at least one sensor of at least one of the sensor units comprises a plurality of sensors arranged in a line perpendicular to a direction of a portion of the linear installation.

8. The system according to claim 1, wherein the sensor units are disposed away from the linear installation.

9. A system for detecting, locating and identifying incidents of approaching a linear installation, that includes a plurality of sensing units positioned in an array along a linear installation at a distance one from each other, wherein each unit comprises;
   at least one sensor for sensing seismic or acoustic interference or noise in accordance with configuration of the system, and means for generating a suitable indicating signal;
   signal processing means for analyzing the signal and comparing the signal to a cache or data bank of seismic or acoustic interference or noise signatures embedded in at least one of the sensing units; and
   communication means for transferring data from said at least one of the sensing units to a distant command and control center;
   wherein the communication means of a first sensor unit can transmit or receive communications that transfer data by a chaining mode towards the communication means of two adjacent sensor units.

10. The system according to claim 9, where the adjacent sensor units are positioned on each side of the communication means of the first sensor unit.

11. A method for detecting, locating and identifying incidents of approaching towards a linear installation, that comprises positioning sensing units in an array along a linear installation at a distance one from each other; focusing a covering lobe onto an area of desired surveillance utilizing phased array technology, and sensing seismic or acoustic interference or noise happening alongside the linear installation in accordance with the configuration of the system; comparing the sensed interference or noise to a cache or data bank of seismic or acoustic interference or noise signatures embedded in at least one of the sensing units; and transferring data from the at least one of the sensing units to a distant remote command and control center.

12. The method according to claim 11, which further comprises chaining the data to proceed in both directions along the sensing units.

13. The method according to claim 11, which further comprises triggering at least one visual target verification unit, in accordance with the location of the sensing alongside the length of the array.

14. The method according to claim 11, wherein the linear installation is a buried or above ground system.

15. The method according to claim 11, wherein the at least one of the sensor units comprises a plurality of sensors, and the method further comprises arranging the sensors in a line perpendicular to a direction of a portion of the linear installation.

16. The method according to claim 11, wherein the sensor units are disposed away from the linear installation.

17. A system for detecting, locating and identifying incidents of approaching a linear installation comprising:

a command and control center; and a plurality of sensing units positioned at a distance one from each other, along and away from a linear installation, wherein each unit comprises at least one sensor for sensing seismic or acoustic interference or noise, that generates a signal, a data bank comprising seismic, acoustic interference, or noise signatures;

a signal processor for comparing the signal to the signatures, and a communication card for transferring a result of the signal processor to the command and control center;

wherein the at least one sensor of at least one of the sensor units comprises a plurality of sensors arranged in a line perpendicular to a direction of a portion of the linear installation.

* * * * *